April 28, 1964 M. M. KAUFMAN 3,131,378

TUNNEL DIODE MEMORY WITH CAPACITIVE SENSING

Filed March 23, 1961

INVENTOR

MELVIN M. KAUFMAN

BY Howard W. Hermann

AGENT

United States Patent Office 3,131,378
Patented Apr. 28, 1964

3,131,378

TUNNEL DIODE MEMORY WITH CAPACITIVE SENSING

Melvin M. Kaufman, Merchantville, N.J., assignor, by mesne assignments, to the United States of America as represented by the Secretary of the Navy Filed Mar. 23, 1961, Ser. No. 97,979
1 Claim. (Cl. 340—173)

The present invention relates to memory cells for high speed computers and more particularly to computer memory cells utilizing tunnel diodes or, as they are sometimes called, "Esaki" diodes.

In the field of electronic computers a continuous search goes on for components which will be smaller and less expensive, but will operate more rapidly and be more reliable than any other component in use or under test.

A primary object of the invention, therefore, is the provision of a high speed random access memory for an electronic computer which has a higher speed capability than prior memories.

Another object is to provide a high speed computer memory which will occupy less space than presently known memories having similar capabilities.

In accordance with these objects the present invention utilizes so-called "Esaki" diodes or tunnel diodes in memory cells which are capacitively coupled to their sensing lines. Such an arrangement has been found to have a very high speed capability while requiring a minimum of space.

Figure 1:
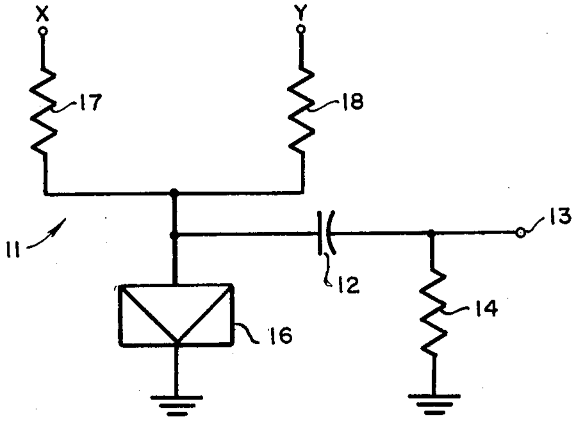
Figure 2:
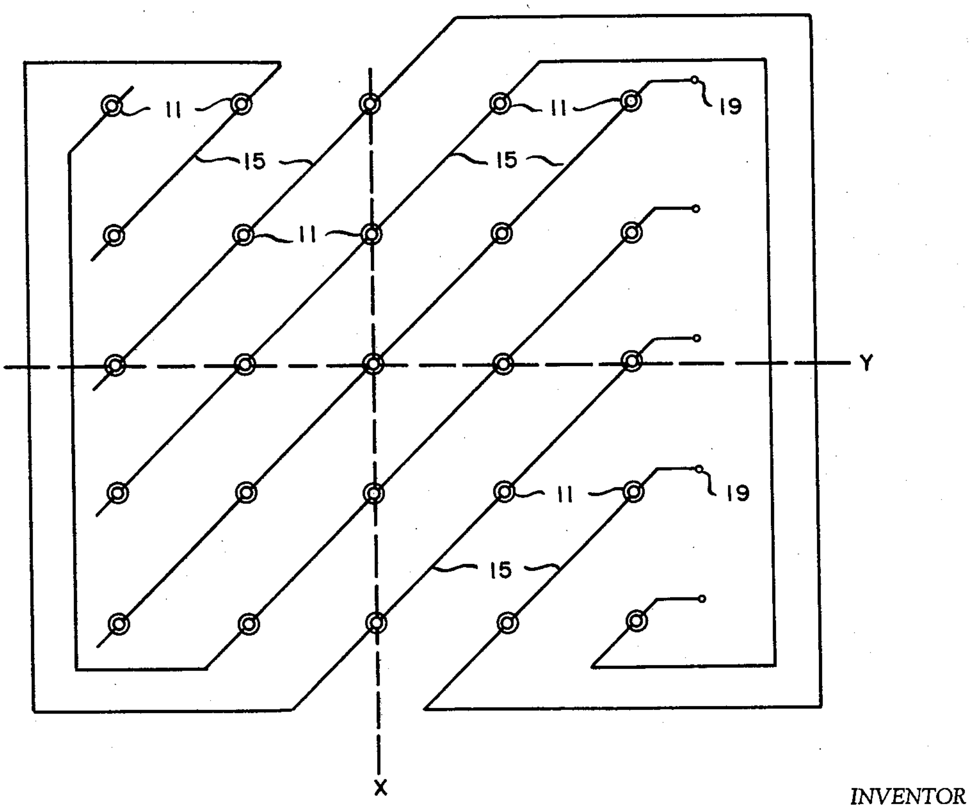

Other objects and many of the attendant advantages of this invention will be readily appreciated as the same becomes better understood by reference to the following detailed description when considered in connection with the accompanying drawings wherein:

FIG. 1 is a schematic diagram of a memory cell with capacitive coupling in accordance with the present invention; and FIG. 2 is a schematic diagram of a sense line arrangement for use with the memory cell shown in FIG. 1.

Referring now to FIG. 1 there is shown a memory cell (indicated generally by numerals 11) coupled by capacitor 12 to sensing terminal 13.

A resistance 14, which is shown as being connected between sensing terminal 13 and ground, is indicative of the characteristic impedance of the sensing line to which terminal 13 is adapted to be connected in the memory matrix.

Memory cell 11 comprises a tunnel diode 16 which has connected across it a resistive load comprising an X-selection resistor 17 and a Y-selection resistor 18.

The tunnel diode is a device which exhibits a negative resistance resulting from quantum tunneling. For use in a computer memory, a memory element must be capable of bistable operation. It has been found that to achieve a bistable element using a tunnel diode, it is only necessary to place a resistive load across the diode. By dividing this resistive load into two parts, one part being used as an X-selection resistor and the other part being used as a Y-selection resistor, each delivering half the switching current, the element can be selected out of an X—Y matrix. The peak and valley currents of the tunnel diode represent adequate thresholds (coercive current), allowing the current-driven memory cell to be selected out of a random-access coincident matrix.

To sense a memory location's stored information, i.e. the tunnel diode state, the location is read destructively. The selection current direction is referenced with aspect to the "0" state of the tunnel diode, always leaving the tunnel diode in the "0" state; upon selection a switching tunnel diode is said to have stored a "1" while a non-switching tunnel diode is said to have stored a "0." Therefore, if the memory cell is storing a "1" when selected and read, the information is destroyed and must be regenerated. Destructive readout is used because it results in the greatest voltage change across the tunnel diode and thereby provides the largest output to the sense line.

The memory cell is coupled to the sense line by means of a capacitor 12 as shown in FIG. 1, the sense line being connected to sensing terminal 13. Transformer coupling of the memory cell to the sense line is possible but even with printed circuit transformers the transformer must be comparatively large and therefore creates problems in packaging of the memory cells. The use of capacitor 12 instead of a transformer allows a cell packaging arrangement which is much more compact than would be possible with transformer coupling. In a practical embodiment in a ten nanosecond cycle time memory, the value of coupling capacitor 12 was between 1 and 1.5 micromicrofarads. Such capacitors were printed on 5 mil copper-diclad teflon board and allow a practical memory cell spacing of as close as 0.2 inch. Obviously other types of capacitors could, however, be used without departing from the spirit and scope of the invention.

Although, with inductive coupling, output signals can be connected to the sense line in opposite phase so that half-select disturbances on the line cancel out, this is not possible with capacitive coupling. Half-select disturbances are caused by the appearance of switching current over either the X-selection resistor or the Y-selection resistor, but not both as would be required for selection. To prevent the appearance of such disturbances on the selected sense line, the capacitively coupled memory cells are connected in a matrix such as that shown in FIG. 2. In this matrix, memory cells 11 are each coupled to a sense line 15. The pattern as illustrated uses 5 sense lines, each interconnecting 5 memory cells. Obviously greater numbers of sense lines and memory cells can be similarly interconnected. Each of sense lines 15 terminates in a sense amplifier pickoff point 19. The broken lines X and Y are representative of the directions of the connections of the X and Y selection lines, respectively. When signals are applied to the X and Y selection lines for selection of a single memory cell in the matrix, it will be seen from the figure that only the output from the selected memory cell will appear on the sense line to which the selected cell is connected. In this manner the half-select disturbs are completely eliminated from the selected sense line, simply by use of the geometry of the system.

Thus there has been described a tunnel diode memory which can be made with desirable packaging properties while still maintaining the desirable electrical properties at a reasonable cost. A memory matrix arrangement has been described which makes practically possible the elimination of half-select noise on the sense line even though capacitive coupling is used to couple the memory cells to the sense line.

Obviously many modifications and variations of the present invention are possible in the light of the above teachings. It is therefore to be understood that within the scope of the appended claim the invention may be practiced otherwise than as specifically described.

What is claimed is:

A memory for a high speed electronic computer, comprising a plurality of tunnel diode memory cells arranged in rows in a square matrix, a resistive load across each tunnel diode in said memory cells, said resistive load comprising an X selection resistor and a Y selection resistor; a plurality of X selection lines, each of said X selection lines being connected to the X selection resistors of the memory cells of a single row; a plurality of Y selection lines, each of said Y selection lines being connected to the Y selection resistors of the memory cells of a single row perpendicular to the first named single rows; a purely capacitive means connected to each tunnel diode for use in sensing the state thereof, and a plurality of sensing lines connected to said purely capacitive means, each sensing line being diagonally coupled with respect to the X and Y selection lines to a number of memory cells equal to the number of memory cells in each row, but coupled only to a single cell in each row, whereby half-select disturbances are eliminated on the selected sensing line.

References Cited in the file of this patent

UNITED STATES PATENTS

| | | |
|---|---|---|
| 2,691,156 | Saltz | Oct. 5, 1954 |
| 3,017,613 | Miller | Jan. 16, 1962 |

OTHER REFERENCES

1960 International Solid-State Circuits Conference, Digest of Technical Papers, pp. 52, 53, by J. C. Miller et al., Feb. 11, 1960.

1960 IRE International Convention Record, Part 2, pages 114–123, by M. M. Kaufman, Mar. 21–24, 1960.

IBM Technical Disclosure Bulletin, August 1960, page 43 (by E. W. Bauer et al.).